(12) United States Patent
Chen et al.

(10) Patent No.: US 6,907,307 B2
(45) Date of Patent: Jun. 14, 2005

(54) SUPPORT VOLUME CALCULATION FOR A CAD MODEL

(75) Inventors: Yong Chen, Valencia, CA (US); Rajeev B. Kulkarni, Valencia, CA (US)

(73) Assignee: 3D Systems, Inc., Valencia, CA (US)

( * ) Notice: Subject to any disclaimer, the term of this patent is extended or adjusted under 35 U.S.C. 154(b) by 93 days.

(21) Appl. No.: 10/461,957

(22) Filed: Jun. 13, 2003

(65) Prior Publication Data

US 2004/0006405 A1 Jan. 8, 2004

Related U.S. Application Data

(63) Continuation-in-part of application No. 10/188,574, filed on Jul. 2, 2002, now abandoned.

(51) Int. Cl.[7] .............................................. G06F 19/00
(52) U.S. Cl. ........................ 700/119; 700/118; 700/98; 700/120; 700/163; 264/401; 264/512; 264/516; 427/466; 427/470
(58) Field of Search ................................ 700/118, 119, 700/97, 98, 163; 345/419, 420; 264/75, 401, 308, 633, 642; 427/472, 470, 466

(56) References Cited

U.S. PATENT DOCUMENTS

| | | |
|---|---|---|
| 4,575,330 A | 3/1986 | Hull |
| 4,665,492 A | 5/1987 | Masters |
| 4,752,352 A | 6/1988 | Feygin |
| 4,863,538 A | 9/1989 | Deckard |
| 5,015,312 A | 5/1991 | Kinzie |
| 5,121,329 A | 6/1992 | Crump |
| 5,134,569 A | 7/1992 | Masters |
| 5,141,680 A | 8/1992 | Almquist et al. |
| 5,204,055 A | 4/1993 | Sachs et al. |
| 5,216,616 A | 6/1993 | Masters |
| 5,260,009 A | 11/1993 | Penn |
| 5,321,622 A | 6/1994 | Smalley |
| 5,340,433 A | 8/1994 | Crump |
| 5,345,391 A | 9/1994 | Hull et al. |
| 5,740,051 A | 4/1998 | Sanders, Jr. et al. |
| 5,943,235 A | 8/1999 | Earl et al. |
| 6,270,335 B2 | 8/2001 | Leyden et al. |
| 6,401,001 B1 * | 6/2002 | Jang et al. ................... 700/118 |

OTHER PUBLICATIONS

U.S. Appl. No. 09/970,956 "Quantitized Feed System for Solid Freeform Fabrication".

* cited by examiner

*Primary Examiner*—Leo Picard
*Assistant Examiner*—Douglas S. Lee
(74) *Attorney, Agent, or Firm*—Michael A. Ervin; Ralph D'Alessandro

(57) ABSTRACT

In solid freeform fabrication processes that make use of a removable support material, pre-calculation of the amount of support material needed for a build is difficult (inaccurate or slow) because the digital data for generating the support material is often not generated until the build is in progress. A method is proposed that has been shown to generate rapid and accurate estimates of the amount of both build and support material needed before a build begins, to accurately predict before a build begins when replenishment materials are needed, and to track material consumptions over time.

7 Claims, 6 Drawing Sheets

SUPPORT VOLUME CALCULATION FOR A CAD MODEL

This application is a continuation-in-part of application Ser. No. 10/188,574 filed Jul. 2, 2002 now abandoned.

BACKGROUND OF THE INVENTION

1. Field of the Invention

The invention relates in general to solid freeform fabrication, and in particular to those solid freeform fabrication techniques that build objects in a layer-wise fashion and require a support structure for the build. This can include stereolithography, selective deposition modeling, and direct composite manufacturing using pastes or semi-solid materials.

2. Description of the Prior Art

Several technologies have been developed for the rapid creation of models, prototypes, and parts for limited run manufacturing. These technologies are generally called Solid Freeform Fabrication techniques, and are herein referred to as "SFF". Some SFF techniques include stereolithography, selective deposition modeling, laminated object manufacturing, selective phase area deposition, multi-phase jet solidification, ballistic particle manufacturing, fused deposition modeling, particle deposition, laser sintering, direct composite manufacturing and the like. Generally in SFF techniques, complex parts are produced from a modeling material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers, often called laminae. These laminae are sometimes called object cross-sections, layers of structure, object layers, layers of the object, or simply layers (if the context makes it clear that solidified structure of appropriate shape is being referred to). Each lamina represents a cross-section of the three-dimensional object. Typically lamina are formed and adhered to a stack of previously formed and adhered laminae. In some SFF technologies, techniques have been proposed which deviate from a strict layer-by-layer build up process wherein only a portion of an initial lamina is formed and prior to the formation of the remaining portion(s) of the initial lamina, at least one subsequent lamina is at least partially formed.

Generally, in most SFF techniques, structures are formed in a layer-by-layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM" a phase change build material is jetted or dropped in discrete droplets, or extruded through a nozzle, to solidify on contact with a build platform or previous layer of solidified material in order to build up a three-dimensional object in a layer wise fashion. Other synonymous names for SDM used in the industry are: solid object imaging, deposition modeling, multi-jet modeling, three-dimensional printing, thermal stereolithography, and the like. Direct composites manufacturing refers to a layer-wise build technology, which utilizes slurry pastes of metals or ceramics as the build material.

In one class of SFF techniques, a three-dimensional object is built up by applying successive layers of unsolidified, flowable material to a working surface, and then selectively exposing the layers to synergistic stimulation in desired patterns, causing the layers to selectively harden into object laminae which adhere to previously-formed object laminae. In this approach, material is applied to the working surface both to areas that will not become part of an object lamina, and to areas that will become part of an object lamina. Typical of this approach is Stereolithography (SL), as described in U.S. Pat. No. 4,575,330, to Hull. According to one embodiment of Stereolithography, the synergistic stimulation is radiation from an UV laser, and the material is a photopolymer. Another example of this approach is Selective Laser Sintering (SLS), as described in U.S. Pat. No. 4,863,538, to Deckard, in which the synergistic stimulation is IR radiation from a carbon dioxide laser and the material is a sinterable powder. A third example is Three-Dimensional Printing (3DP) and Direct Shell Production Casting (DSPC), as described in U.S. Pat. Nos. 5,340,656 and 5,204,055, to Sachs, et al., in which the synergistic stimulation is a chemical binder (e.g. an adhesive), and the material is a powder consisting of particles that bind together upon selective application of the chemical binder.

In a second class of SFF techniques, an object is formed by successively cutting object cross-sections having desired shapes and sizes out of sheets of material to form object lamina. Typically in practice, the sheets of paper are stacked and adhered to previously cut sheets prior to their being cut, but cutting prior to stacking and adhesion is possible. Typical of this approach is Laminated Object Manufacturing (LOM), as described in U.S. Pat. No. 4,752,352, to Feygin in which the material is paper, and the means for cutting the sheets into the desired shapes and sizes is a carbon dioxide laser. U.S. Pat. No. 5,015,312 to Kinzie also addresses building object with LOM techniques.

In a third class of SFF techniques, object laminae are formed by selectively depositing an unsolidified, flowable material onto a working surface in desired patterns in areas which will become part of an object laminae. After or during selective deposition, the selectively deposited material is solidified to form a subsequent object lamina that is adhered to the previously formed and stacked object laminae. These steps are then repeated to successively build up the object lamina-by-lamina. This object formation technique may be generically called Selective Deposition Modeling (SDM). The main difference between this approach and the first approach is that the material is deposited only in those areas that will become part of an object lamina. Typical of this approach is Fused Deposition Modeling (FDM), as described in U.S. Pat. Nos. 5,121,329 and 5,340,433, to Crump, in which the material is dispensed in a flowable state into an environment which is at a temperature below the flowable temperature of the material, and which then hardens after being allowed to cool. A second example is the technology described in U.S. Pat. No. 5,260,009, to Penn. A third example is Ballistic Particle Manufacturing (BPM), as described in U.S. Pat. Nos. 4,665,492; 5,134,569; and 5,216,616, to Masters, in which particles are directed to specific locations to form object cross-sections. A fourth example is Thermal Stereolithography (TSL) as described in U.S. Pat. No. 5,141,680, to Almquist et. al.

In SDM, as well as the other SFF approaches, typically accurate formation and placement of working surfaces are required so that outward facing cross-sectional regions can be accurately formed and placed. The first two approaches naturally supply working surfaces on which subsequent layers of material can be placed and lamina formed. However, since the third approach, SDM, does not necessarily supply a working surface, it suffers from a particularly acute problem of accurately forming and placing subsequent lamina which contain regions not fully supported by previously dispensed material such as regions including outward facing surfaces of the object in the direction of the previously dispensed material. In the typical building process where subsequent laminae are placed above previously formed laminae this is particularly a problem for down-facing surfaces (down-facing portions of laminae) of the object. This can be understood by considering that the third approach theoretically only deposits material in those areas of the working surface which will become part of the corresponding object lamina. Thus, nothing will be available to provide a working surface for or to support any down-facing surfaces appearing on a subsequent cross-section. Downward facing regions, as well as upward facing and continuing cross-sectional regions, as related to photo-based Stereolithography, but as applicable to other SFF technologies including SDM, are described in detail in U.S. Pat. Nos. 5,345,391, and 5,321,622, to Hull et. al. and Snead et. al., respectively. The previous lamina is non-existent in down-facing regions and is thus unavailable to perform the desired support function. Similarly, unsolidified material is not available to perform the support function since, by definition, in the third approach, such material is typically not deposited in areas which do not become part of an object cross-section. The problem resulting from this situation may be referred to as the "lack of working surface" problem. This problem and alternate approaches to solving it is described in U.S. Pat. No. 6,270,335 to Leyden et al.

All patents referred to herein above in this section of the specification are hereby incorporated by reference as if set forth in full.

In addition to this "lack of working surface" problem, many of the build processes used in these technologies often result in stresses that can result in distortions of the object during the build. In addition complex objects can have significant overhanging features during the build, requiring an underlying support to prevent sagging. For all of the aforementioned issues these SFF techniques often include the simultaneous building of support structures that may be used for supporting an overhanging feature, for anchoring the object during the build, or for providing a working surface for deposition. These support structures may be a different material or sometimes the same material. This support material is later removed to generate the final object. An important and unsolved need for process planning is the ability to accurately and rapidly predict before a build the amounts of build and support material needed, to predict when material replenishment is needed, and to track material usage over time.

It is straightforward to pre-calculate the volume and therefore the weight of an object to be made if a CAD or STL model is available of the object. The difficulty comes in calculating the volume and weight of the support material, which is not in CAD or STL format, and will only be calculated and generated during the build on a slice-on-the-fly basis. Thus there is a need for a method for accurately and quickly pre-calculating the volume and weight required for support materials in certain solid freeform fabrication techniques.

BRIEF SUMMARY OF THE INVENTION

The instant invention provides benefits across a number of SFF technologies. While the description, which follows hereinafter, is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is an aspect of this invention to provide a method to predict before a build is made in a solid freeform fabrication process in which an object is formed with a removable support material the volume and weight of build and support materials that will be consumed.

It is a further aspect of this invention to provide a method to predict before a build is made in a solid freeform fabrication process in which an object is formed with a removable support material whether enough build and support materials are available in the system to complete the build.

It is a further aspect of this invention to provide such a method that is both accurate and rapid.

The invention includes in a solid freeform fabrication process wherein an object is formed with a removable support material, the process including the steps of a) rapidly and accurately predicting the volume and weight of support material required to form the object prior to commencing the building of the object, b) predicting when replenishment of the support material is required, and c) tracking consumption of support material over time.

Further the invention includes in a solid freeform fabrication process wherein an object is formed with a removable support material, the process for rapidly and accurately predicting the volume and weight of support material required to form the object prior to commencing the building of the object, the process comprising a) selecting the location and orientation of said object in the build chamber, b) calculating a total sweeping body volume associated with said object, c) calculating the volume of said object, d) subtracting said object volume from said total sweeping body volume to give a sweeping body support material volume, d) multiplying said sweeping body support material volume by a density of support structure to give a support material weight, and e) adding the estimated weight of waste support material.

The rapid calculation is done by mapping an X-Y grid across the X-Y extents of the object model, determining the top-most triangle existing for each cell of the grid, recording the z-height of that triangle from the model, using that z-height to calculate the volume of the rectangular block under each cell, and summing those volumes to get the entire sweeping body volume. The volume of the object (in CAD or STL) can then be calculated using conventional equations and subtracted from the sweeping body to give the support volume. The weight of the support material can then be calculated from knowing the density of the support material. If the support structure is not continuous, but instead is a support web for example, the density can be adjusted to account for that difference.

Further the invention also includes in a solid freeform fabrication process wherein an object is formed from a build material with a removable support material, the process including the steps of a) rapidly and accurately predicting a volume and weight of said build material required to form said object prior to commencing the building of said object, b) predicting when replenishment of said build material is required, and c) tracking consumption of said build material over time.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

While the present invention is applicable to many SFF techniques the invention will be described with respect to a SDM technique utilizing an ink jet print head dispensing a ultraviolet radiation curable phase change material. However it is to be appreciated that the present invention can be implemented with any SFF technique utilizing a wide variety of materials. For example, the curable phase change material can be cured by exposure to actinic radiation having wavelengths other than in the ultraviolet band of the spectrum, or by subjecting the material to thermal heat. Or the curing may be affected by a selective exposure from a laser beam, as in stereolithography. Alternately the build material may not be a curable material but a material which changes phase due to temperature, being deposited in a molten state, and quickly hardening due to cooling.

Figure 1:
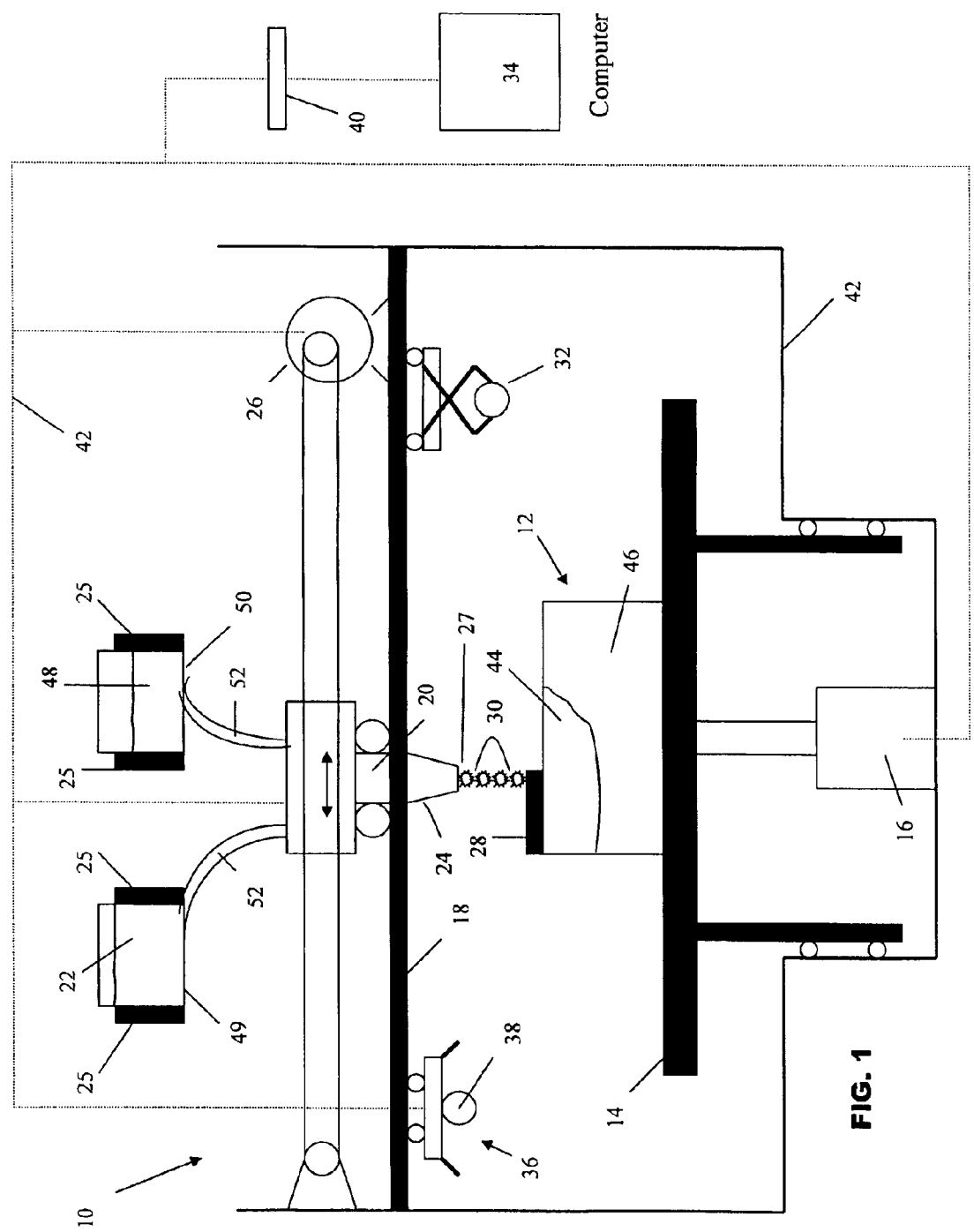
FIG. 1 is a diagrammatic side view of a solid deposition modeling apparatus.

Referring particularly to FIG. 1 there is illustrated generally by the numeral 10 a SDM apparatus for practicing an embodiment of an SDM process. The SDM apparatus 10 is shown building a three-dimensional object 44 on a support structure 46 in a build environment shown generally by the numeral 12. The object 44 and support structure 46 are built in a layer-by-layer manner on a build platform 14 that can be precisely positioned vertically by any conventional actuation means 16. Directly above and parallel to the platform 14 is a rail system 18 on which a material dispensing trolley 20 resides carrying a dispensing device 24. Preferably the dispensing device 24 is an ink jet print head that dispenses a build material and support material and is of the piezoelectric type having a plurality of dispensing orifices. However, other ink jet print head types could be used, such as an acoustic or electrostatic type, if desired. A preferred ink jet print head is the Z850 print head available from Xerox Corporation of Wilsonville, Oreg. Alternatively a thermal spray nozzle could be used instead of an ink jet print head, if desired.

The trolley carrying the print head 24 is fed the curable phase change build material 22 from a remote reservoir 49. The remote reservoir is provided with heaters 25 to bring and maintain the curable phase change build material in a flowable state. Likewise, the trolley carrying the print head 24 is also fed the non-curable phase change support material from remote reservoir 50 in the flowable state. In order to dispense the materials, a heating means is provided to initially heat the materials to the flowable state, and to maintain the materials in the flowable state along its path to the print head. The heating means comprises heaters 25 on both reservoirs 49 and 50, and additional heaters (not shown) on the umbilcals 52 connecting the reservoirs to the print head 24. Located on the print head 24 is a plurality of discharge orifices 27 for dispensing both the build material and support material, although just one is shown in FIG. 1. Each discharge orifice is dedicated to dispense either the build material or the support material in a manner that either material can be dispensed to any desired target location in the build environment.

A reciprocating means is provided for the dispensing device 24 which is reciprocally driven on the rail system 18 along a horizontal path by a conventional drive means 26 such as an electric motor. Generally, the trolley carrying the dispensing device 24 takes multiple passes to dispense one complete layer of the materials from the discharge orifices 27. In FIG. 1, a portion of a layer 28 of dispensed build material is shown as the trolley has just started its pass from left to right. Discreet dispensed droplets 30 are shown in mid-flight, and the distance between the discharge orifice and the layer 28 of build material is greatly exaggerated for ease of illustration. The layer 28 may be all build material, all support material, or a combination of build and support material, as needed, in order to form and support the three-dimensional object.

The build material and support material are dispensed as discrete droplets 30 in the flowable state, which solidify upon contact with the layer 28 as a result of a phase change. Alternatively, the materials may be dispensed in a continuous stream in an SDM system, if desired. Each layer of the object is divided into a plurality of pixels on a bit map, in which case a target location is assigned to the pixel locations of the object for depositing the curable phase change material 22. Likewise, pixel coordinates located outside of the object may be targeted for deposition of the non-curable phase change material 48 to form the supports for the object as needed. Generally, once the discrete droplets are deposited on all the targeted pixel locations of the bit map to establish an initial layer thickness, a solid fill condition is achieved. Preferably the initial layer thickness established during dispensing is greater than the final layer thickness such that the solid fill condition for each layer contains material in excess of that needed for the layer.

A planarizer 32 is drawn across the layer to smooth the layer and normalize the layer to establish the final layer thickness. The planarizer 32 is used to normalize the layers as needed in order to eliminate the accumulated effects of drop volume variation, thermal distortion, and the like, which occur during the build process. It is the function of the planarizer to melt, transfer, and remove portions of the dispensed layer of build material in order to smooth it out and set a desired thickness for the last formed layer prior to curing the material. This ensures a uniform surface topography and layer thickness for all the layers that form the three-dimensional object, however it produces waste material that must be removed from the system. The planarizer 32 may be mounted to the material dispensing trolley 20 if desired, or mounted separately on the rail system 18, as shown.

The planarizer 32 is utilized in SDM building techniques that deposit build material in excess of a desired thickness for each layer according to data of a prescribed pattern for each layer, and then the planarizer removes the excess build material from each layer to achieve the desired thickness. The use of the planarizer is preferred generally because it does not require an active feedback system that monitors the surface condition of a given layer. Importantly, however, planarizing must be completed for a given layer prior to curing the layer.

In an alternative embodiment for normalizing the layers, a surface scanning system can be provided. Such a system would actively monitor the surface condition of any given layer and provide feedback data that can be used to selectively dispense additional material in low areas to form a uniform layer. One such system is disclosed in U.S. patent application Ser. No. 09/779,355 to Kerekes, filed on Feb. 8, 2001 which is herein incorporated by reference as set forth in full. Such a closed loop system would be desirable to actively control the accumulation of material forming the layers. Such a system could increase build speed by eliminating the necessity to dispense material in excess of that required for a layer which is then removed by a planarizer. Hence a surface scanning system may be used, if desired, in conjunction with the present invention to normalize the layers.

A waste collection system (not shown in FIG. 1) is used to collect the excess material generated during planarizing. The waste collection system may comprise an umbilical that delivers the material to a waste tank or waste cartridge, if desired. A preferred waste system for curable phase change materials is disclosed in the concurrently filed U.S. patent application Ser. No. 09/970,956 titled "Quantitized Feed System for Solid Freeform Fabrication", assigned to 3D Systems Inc., which is herein incorporated by reference as set forth in full.

In the embodiment shown in FIG. 1, a single print head dispenses both the curable phase change material and the non-curable phase change material. Alternatively, multiple print heads could be used, each being dedicated to dispensing either or both of the materials. Preferably the non-curable material is selected so as to be easily removed from the three-dimensional object at the end of the layer wise build process, yet have a similar melting point and freezing point as the curable material so that dispensing and planarizing will be uniform. In this embodiment, separate material delivery systems are required for the two different materials, however only one waste collection system is needed since the waste is a combination of both materials collected after planarizing.

Unique to the SDM apparatus 10 is the provision of an actinic radiation source generally shown by numeral 36 mounted on rail system 18. The radiation source 36 is reciprocally driven along rail system 18 to position the radiation source over a just formed layer of material. The radiation source 36 includes an ultraviolet radiation-emitting bulb 38 which is used to provide flood exposure of UV radiation to each layer after the planarizer has normalized the layer. Alternatively multiple layers can be dispensed and normalized prior to curing by flood exposure to UV radiation. The exposure is executed in a flash manner, preferably by turning on and off the bulb 38 at a desired time, such as after the planarizer has been retracted from the build area and while the radiation source is traversed along the rail system over the build area. Alternatively, the bulb could remain on and a shutter system could be used to control the flash operation of exposure, if desired. Although the actinic radiation source 36 is shown reciprocally mounted on rail system 18, it may be mounted directly on the dispensing trolley, if desired. It is important to shield the print head and planarizer from exposure to the actinic radiation so as to prevent curing material in the dispensing orifices or on the surface of the planarizer, either of which would ruin the build process and damage the apparatus.

Preferably, an external computer 34 generates or is provided with a solid modeling CAD data file containing three-dimensional coordinate data of an object to be formed. Typically the computer 34 converts the data of the object into surface representation data, most commonly into the STL file format. In the preferred embodiment, the computer also establishes data corresponding to support regions for the object. A detailed description of techniques for establishing the data corresponding to support regions is provided in U.S. Pat. No. 5,943,235 which is incorporated herein by reference. When a user desires to build an object, a print command is executed at the external computer in which the STL file is processed, through print client software, and sent to the computer controller 40 of the SDM apparatus 10 as a print job. The processed data transmitted to the computer controller 40 can be sent by any conventional data transferable medium desired, such as by magnetic disk tape, microelectronic memory, network connection, or the like. The computer controller processes the data and executes the signals that operate the apparatus to form the object. The data transmission route and controls of the various components of the SDM apparatus are represented as dashed lines at 42.

The formulations for the build material and support material are dispensed by the SDM apparatus 10 while in a flowable state. The build and support formulations solidify substantially upon contact with the build platform 14 for the first layer, and on top of previously formed layers for subsequent layers. The freezing point of the material, the point the material solidifies to the non-flowable state, is desired to be in a range of between about 40° C. to about 80° C. Preferably the actual freezing point should lean towards the higher temperature, if possible, to assure solidification in light of exothermic heat being generated during cure.

After all the material for each layer is dispensed and solidified, a planarizer 32 is then used to normalize each layer. After normalization, each layer is then provided with a flood exposure to UV radiation by radiation source 38 which is part of an exposure trolley 38. The flood exposure cures the build material and not the support material. The support material is removed to expose the three-dimensional objects.

The support material is removed by further processing. Generally, application of thermal heat to bring the support material back to a flowable state is needed to remove substantially all of the support material from the three-dimensional object. This can be accomplished in a variety of ways. For example, the part can be placed in a heated vat of liquid material such in water or oil. Physical agitation may also be used, such as by directing a jet of the heated liquid material directly at the support material. This can be accomplished by steam cleaning with appropriate equipment. Alternatively, the support material can also be removed by submersing the material in an appropriate liquid solvent to dissolve the support material.

Figure 2:
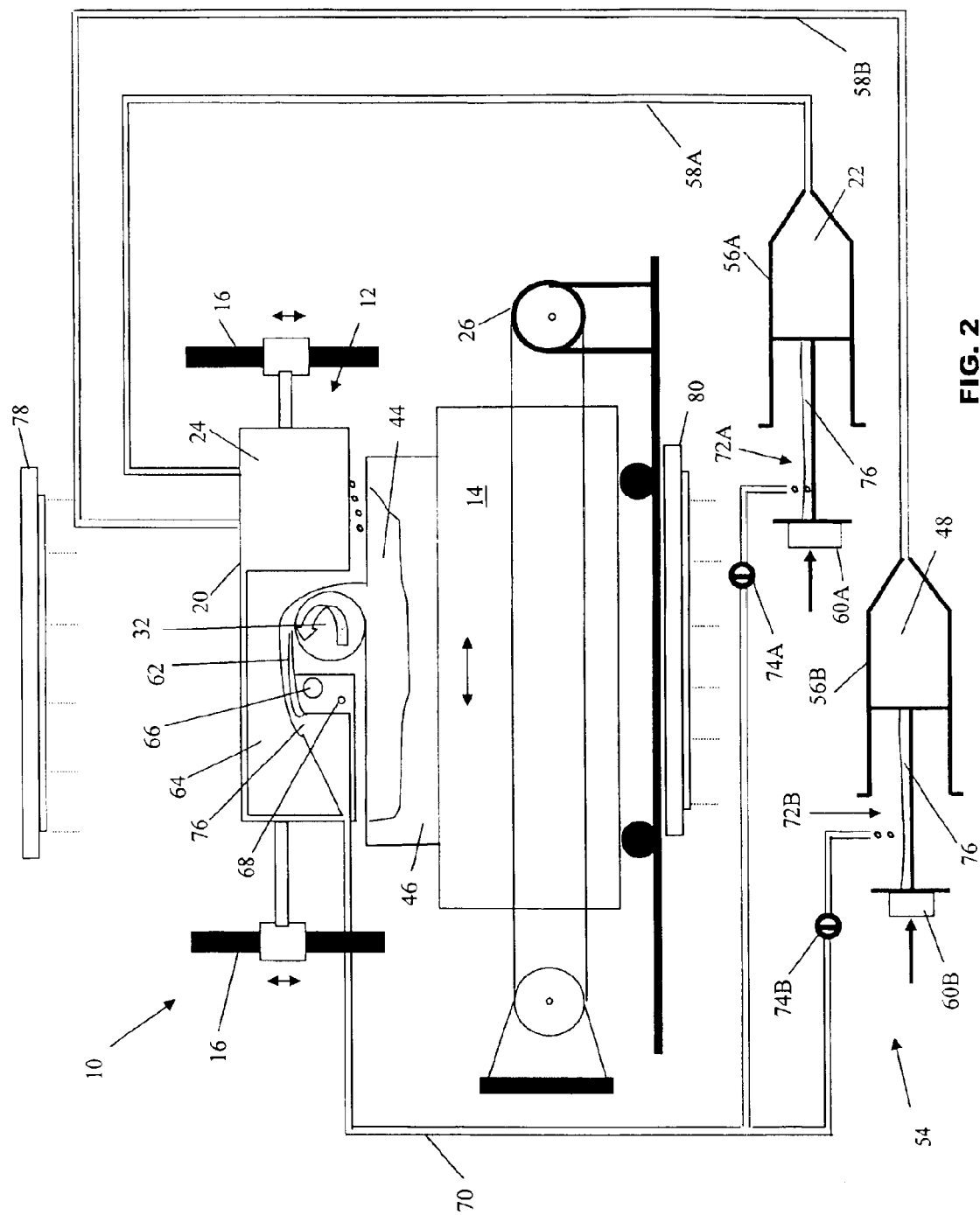
FIG. 2 is a diagrammatic side view of a preferred embodiment of a solid deposition modeling apparatus.

Referring particularly to FIG. 2 there is illustrated generally by the numeral 10 a preferred embodiment of a solid freeform fabrication apparatus for practicing the present invention. This apparatus 10 is shown including schematically a material feed and waste system illustrated generally by numeral 54. In contrast to the SDM apparatus shown in FIG. 1, the build platform 14 in this embodiment is reciprocally driven by the conventional drive means 26 instead of the dispensing trolley 20. The dispensing trolley 20 is precisely moved by actuation means 16 vertically to control the thickness of the layers of the object. Preferably the actuation means 16 comprises precision lead screw linear actuators driven by servomotors. In the preferred embodiment the ends of the linear actuators 16 reside on opposite ends of the build environment 12 and in a transverse direction to the direction of reciprocation of the build platform. However for ease of illustration in FIG. 2 they are shown in a two-dimensionally flat manner giving the appearance that the linear actuators are aligned in the direction of reciprocation of the build platform 14. Although they may be aligned with the direction of reciprocation, it is preferred they be situated in a transverse direction so as to optimize the use of space within the apparatus.

In the build environment generally illustrated by numeral 12, there is shown by the numeral 44 a three-dimensional object being formed with integrally formed supports 46. The object 44 and supports 46 both reside in a sufficiently fixed manner on the build platform 14 so as to sustain the acceleration and deceleration effects during reciprocation of the build platform while still being removable from the platform. In order to achieve this, it is desirable to dispense at least one complete layer of support material on the build platform before dispensing the build material since the support material is designed to be removed at the end of the build process. In this embodiment, the curable phase change build material identified by numeral 22 is dispensed by the apparatus 10 to form the three-dimensional object 44, and the non-curable phase change material identified by numeral 48 is dispensed to form the support 46. Containers identified generally by numerals 56A and 56B respectively hold a discrete amount of these two materials 22 and 48. Umbilicals 58A and 58B respectively deliver the material to the print head 24. The materials 22 and 48 are heated to a flowable state, and heaters (not shown) are provided on the umbilicals 58A and 58B to maintain the materials in the flowable state as they are delivered to the print head 24. In this embodiment the ink jet print head is configured to dispense both materials from a plurality of dispensing orifices so that both materials can be selectively dispensed in a layerwise fashion to any target location in any layer being formed. When the print head 24 needs additional material 22 or 48, extrusion bars 60A and 60B are respectively engaged to extrude the material from the containers 56A and 56B, through the umbilicals 58A and 58B, and to the print head 24.

The dispensing trolley 20 in the embodiment shown in FIG. 2 comprises a heated planarizer 32 that removes excess material from the layers to normalize the layers being dispensed. The heated planarizer contacts the material in a non-flowable state and because it is heated, locally transforms some of the material to a flowable state. Due to the forces of surface tension, this excess flowable material adheres to the surface of the planarizer, and as the planarizer rotates the material is brought up to the skive 62 which is in contact with the planarizer 32. The skive 62 separates the material from the surface of the planarizer 32 and directs the flowable material into a waste reservoir, identified generally by numeral 64 located on the trolley 20. A heater 66 and thermistor 68 on the waste reservoir 64 operate to maintain the temperature of the waste reservoir at a sufficient point so that the waste material in the reservoir remains in the flowable state. The waste reservoir is connected to a heated waste umbilical 70 for delivery of the waste material to the waste receptacles 72A and 72B. The waste material is allowed to flow via gravity down to the waste receptacles 72A and 72B. Although only one umbilical 70 with a splice connection to each waste receptacle is shown, it is preferred to provide a separate waste umbilical 70 between the waste reservoir 64 and each waste receptacle 72A and 72B. For each waste receptacle 72A and 72B, there is associated a solenoid valve 74A and 74B, for regulating the delivery of waste material to the waste receptacles. Preferably the valves 74A and 74B remain closed, and only open when the respective extrusion bars 60A and 60B are energized to remove additional material. For example, if only extrusion bar 60A is energized, only valve 74A will open to allow waste material 76 to be dispensed into the waste receptacle 72A. This feedback control of the valves prevents delivery of too much waste material to either waste receptacle, by equalizing the delivery of waste material in the waste receptacles in proportion to the rate at which material is feed from the containers to the dispensing device. Thus, the delivery of waste material to the waste receptacles is balanced with the feed rates of build material and support material of the feed system.

After the curable phase change build material 22 and non-curable phase change support material 48 are dispensed in a layer, they transition from the flowable state to a non-flowable state. After a layer has been normalized by the passage of the planarizer 32 over the layer, the layer is then exposed to actinic radiation by radiation source 78. Preferably the actinic radiation is in the ultraviolet or infrared band of the spectrum. It is important, however, that planarizing occurs prior to exposing a layer to the radiation source 78. This is because the preferred planarizer can only normalize the layers if the material in the layers can be changed from the non-flowable to the flowable state, which cannot occur if the material 22 is first cured.

In this embodiment, both materials accumulate and are removed by the planarizer 32 to form the waste material. Preferably, a second radiation source 80 is provided to expose the waste material in the waste receptacles to radiation to cause the build material 22 in the receptacles to cure so that there is no reactive material in the waste receptacles.

In any SFF process, including an SDM process, estimating and then tracking usage of the materials is an important need for a user of the technology. An accurate prediction of the amount of both build and support material requirements before a build begins enables a user to better predict consumptions and therefore costs of a build. This can help in making competitive quotes if the user is a service provider. In addition there is a need in such a system for an automatic notification to the user if the system currently has sufficient materials already loaded to complete the next build package as well as a prediction of when materials should be added to the system. Such a system should also track material consumption over time such as a week or month or other desired time period, to help the user in monitoring consumption and therefore costs. It is a vital tool for process planning and cost estimating. To do all of these things the software needs to estimate the amount of material used to build the model and its supports and do so quickly before the build process begins. As different materials are used for the models and supports, the material consumption for both the models and its supports need to be calculated separately in the software. The process for doing this is fairly well understood for the build material because the description of the objects to be built are normally in a CAD or STL data format before the build begins and the methods for calculating the volume of such CAD or STL described objects are known. As described in U.S. Pat. No. 5,943,235 (referenced earlier) however, the data for the support material is often not available before the build begins, and is in fact often generated during the build. An aspect of the instant invention that enables the aforementioned needs to be met is a new approach to calculating the volume and therefore the weight of the support material before the build begins. That approach and technique is described below.

Figure 3:
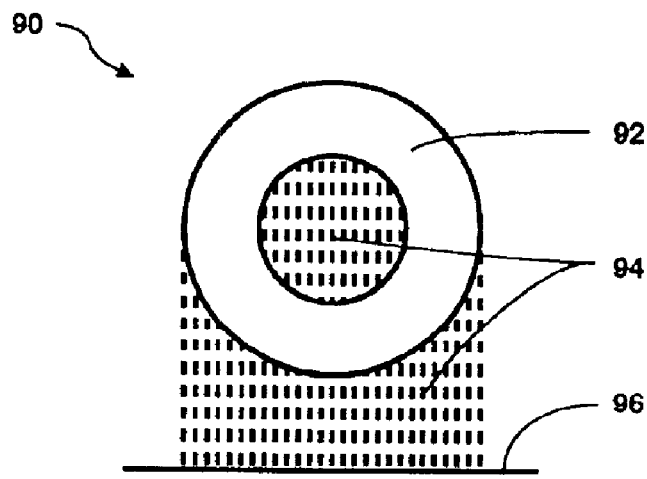
FIG. 3 is an example of an object and its supports on the platform of a solid deposition modeling apparatus.

The total material used to build objects is equal to the material used for the actual objects and the material used to build their supporting structure (supports.) plus any waste material generated by the process. For example, FIG. 3 shows a horizontal cylinder, and the dotted lines represent the supports for the horizontal cylinder. If the cylinder is represented in CAD or STL notation the volume and hence the weight of it can be easily calculated using a standard formula. For example since an STL representation of an object is a collection of triangles we know that the exact volume of a triangulated model ($V_{model}$) can be calculated based on the sum of the signed volume of each tetrahedron formed by a triangle and the original point O(0, 0, 0).

That is, $V_{model} = \Sigma V_{O-Ti}, 1, \ldots, Num_{Tri}$. For a triangle $T_i$ with three vertices A, B, C, $$V_{O-Ti} = (A_X \cdot B_Y \cdot C_Z + A_Y \cdot B_Z \cdot C_X + A_Z \cdot B_X \cdot C_Y - A_Z \cdot B_Y \cdot C_X - A_Y \cdot B_X \cdot C_Z - A_X \cdot B_Z \cdot C_Y)/6;$$

The real problem arises while calculating the volume (and then the weight) of the supports because a digital description (CAD or STL) is not available for the supports before the build process. An aspect of the instant invention is a technique that has been implemented to calculate the support material weight. This technique will be described for STL models but can be easily implemented for other CAD models. Whatever technique is used needs to be rapid and accurate. The calculation time for both supports and build material for a 15 MB STL model should be less than 15 seconds with current computer power. Support volume errors should be less than 10%.

Note that after calculating either the build or support material volumes and weights that a small correction factor must be added to account for the waste materials that are removed as a result of the planarizer action or any other known creation of waste. This factor is a small correction and can be pre-estimated based on the pre-defined level of waste removal.

Figure 4:
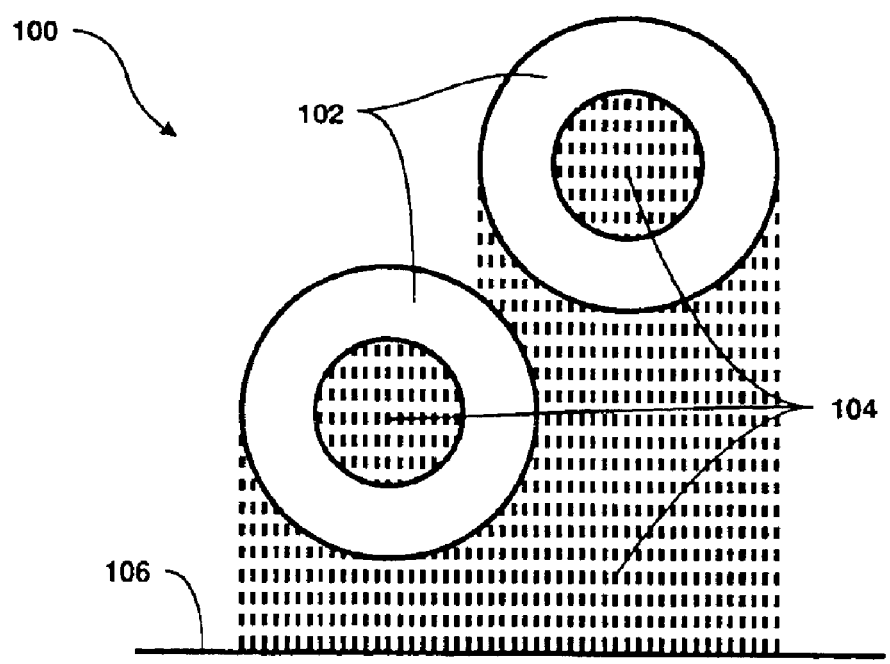
FIG. 4 is an example of two objects and their supports on the platform of a solid deposition modeling apparatus.

For a given orientation of the model, all the down-facing triangles need to be supported. A point to note is that the supports do not always land on the platform. Instead they can land on an up-facing triangle of itself. FIG. 3 shows an object and it's associated supported structure generally indicated by the numeral 90 and includes the object 92, the supports 94, and the platform 96 on which it is built. The upper portion of the inner radius of a horizontal cantilever cylinder is down-facing and will require supports. These supports land inside the cylinder itself (at the up-facing region of the inner radius) and don't go through the cylinder. In more complicated situations, the supports can even land on the up-facing triangles of another part (as shown in FIG. 4). FIG. 4 exhibits two objects and their supports generally indicated generally by the numeral 100. Two horizontal cylinders 102 are supported by support structures 104 connected to a build platform 106. The process of identifying the exact up-facing triangles is very cumbersome and time consuming. Especially if the supports land on only half the triangle, then the triangles needed to be split into two for calculation purposes. Hence, the technique of identifying up-facing triangles was not used. Instead the approach described below was developed.

Figure 5:
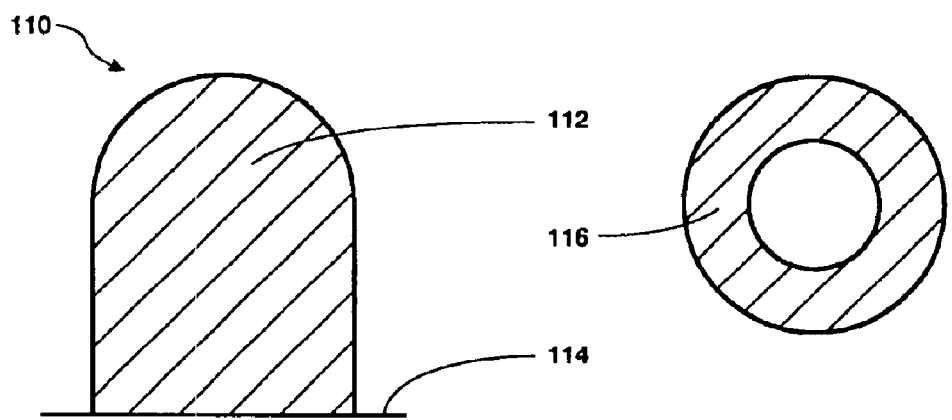
FIG. 5 is an example of a sweeping body and the object corresponding to FIG. 3.

Theoretically, we can project all the triangles of a model or models in Z-direction onto the platform to get a volume called the sweeping body. For example, the sweeping bodies in FIGS. 5 and 6 correspond to the cases in FIGS. 3 and 4 respectively. In FIG. 5 the sweeping body concept is indicated generally by the numeral 110 in which a sweeping body 112 is indicated and the corresponding model or object 116 is shown being subtracted out according to the formula now presented. Assume that the volumes of the sweeping body and the original model are $V_{sweep}$ and $V_{model}$. Then the volume under the sweeping body associated with the support material is:

$$V_{support} = V_{sweep} - V_{model}.$$

Figure 6:
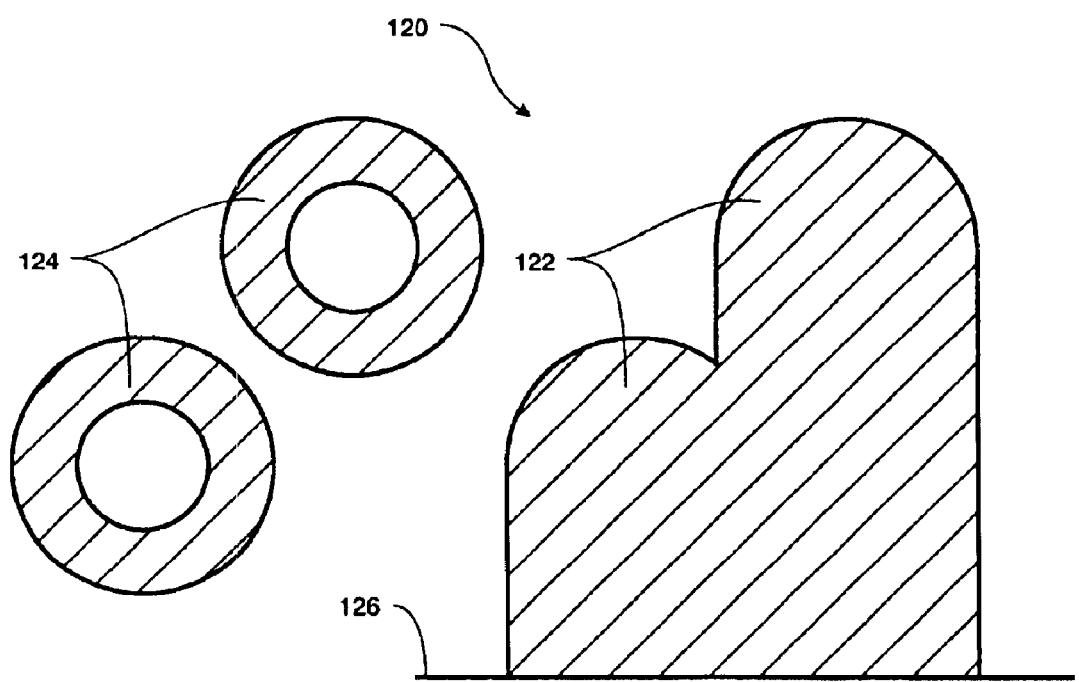
FIG. 6 is an example of sweeping bodies with the objects corresponding to FIG. 4.

FIG. 6 shows the same concept for more than one object or model. The sweeping body 122 incorporates all of the two models and the supports and the models 124 are then subtracted out to leave the sweeping body support volume. Note that this concept is viable regardless of whether the support material is solid and covers 100% of the down facing surfaces or if one of many of the proposed support styles referenced in U.S. Pat. No. 5,943,235 (incorporated by reference earlier) is used. The actual volume of support material will be 100% of $V_{support}$ when the support style is a complete solid and some known fraction of $V_{support}$ based on other support styles. Those fractions can be pre-calculated and stored in the system computer for each style. Similarly the weight of support material can be calculated from the sweeping body support volume $V_{support}$ by multiplying it by the density of the supports structure which is a characteristic density pre-calculated for a given support style and stored in a table in the client software.

It is non-trivial however, to calculate the exact volume of the sweeping body ($V_{sweep}$), as it is time consuming to get all the triangles that form the sweeping body. Hence the following technique, based on the X-Y extents of the objects is used. The extents of a CAD or STL model of an object is the Cartesian coordinate bounding box (in x, y, and z) that can be drawn around the object to exactly enclose it in all dimensions. Z is the vertical dimension. The X-Y extents refers to the "top lid' of such a bounding box. The process is as follows:

1. Map a square X-Y grid (with x-y dimensions of $^3d^2$) across the X-Y extents of the models.
2. For each cell in the grid, determine the topmost triangle of the STL models of the object below.
3. Find the Z-height of that portion of the triangle that is right under the cell.
4. Record this Z-height in this cell.
5. Repeat this process for all the cells and store 0 if there is not a triangle under the cell.
6. Each cell projected down to the platform defines a rectangular block.
7. Find the volume of all such rectangular blocks where the Z-height is not 0.
8. Add all the volumes to give the approximate $V_{sweep}$
9. Calculate the sweeping body support volume by subtracting the model volume from the sweeping-body volume.
10. Multiply the sweeping body support volume by the support structure density to get the support weight. Support structure density is the support material density adjusted to account for the support style. For a 100% solid support the support structure density is the support material density. The density of supports structure is a constant for a given support style and will be stored in a table in the client software.
11. Add in the amount of waste support material. The waste support and waste build materials are calculated from total waste by the ratio of the calculated support and build materials.

It should be noted that there is a trade-off between accuracy and computational speed based on the size of the grid. Choosing grid size will be explained below.

Figure 7:
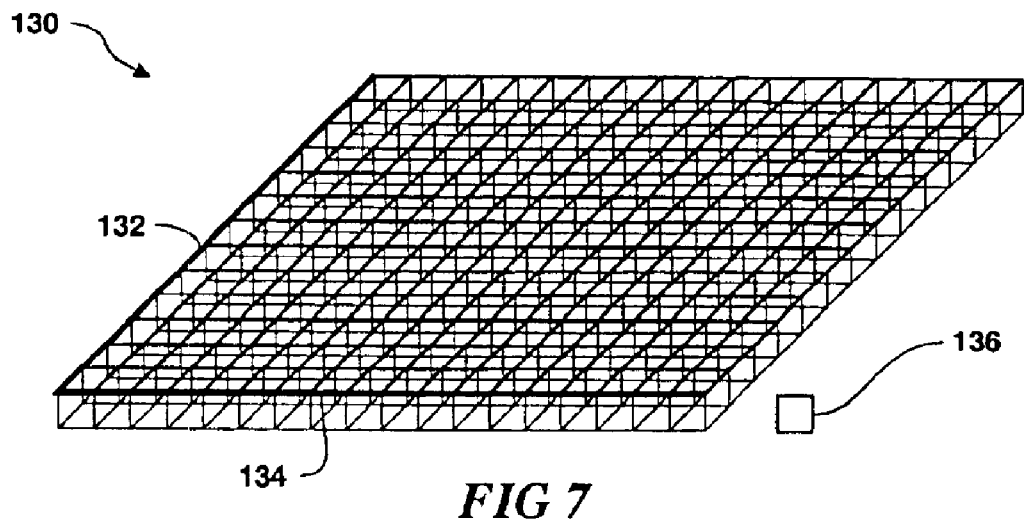
FIG. 7 is an example illustrating a grid pattern mapped onto an X-Y extents of an object.

The volume of the sweeping body is approximated by a Z-buffer corresponding to the grids of the platform as shown in FIG. 7. The x-y extent for an object or model is shown generally by the numeral 130. The y-extent 132 represents the complete y dimension scale of the object and the x-extent 134 represents the x dimension. The grid size 136 is a square of size (d) uniform across the complete x-y extent. For a given square grid size (d), we can estimate $V_{sweep}$ based on the Z values of the grids that are covered by the model.

$$V_{sweep} \approx \Sigma\Sigma(d \cdot d \cdot Z_{i,j}).$$

A z-height algorithm can be used to generate the values for the cells. First, all the grids are initialized as Z=0. Then we go through each up-facing triangles in the CTL file to update Z values (since down-facing triangles will always be overlapped).

Note—A CTL file (also called a compressed-STL file) is a standard file generated from an STL file. It consists of three modules; the compressed file header, the vertices data, and the triangle date, which is a set of triples of integers. Each integer is an index into the array of vertices, indicating the vertices of the triangle.

Figure 8:
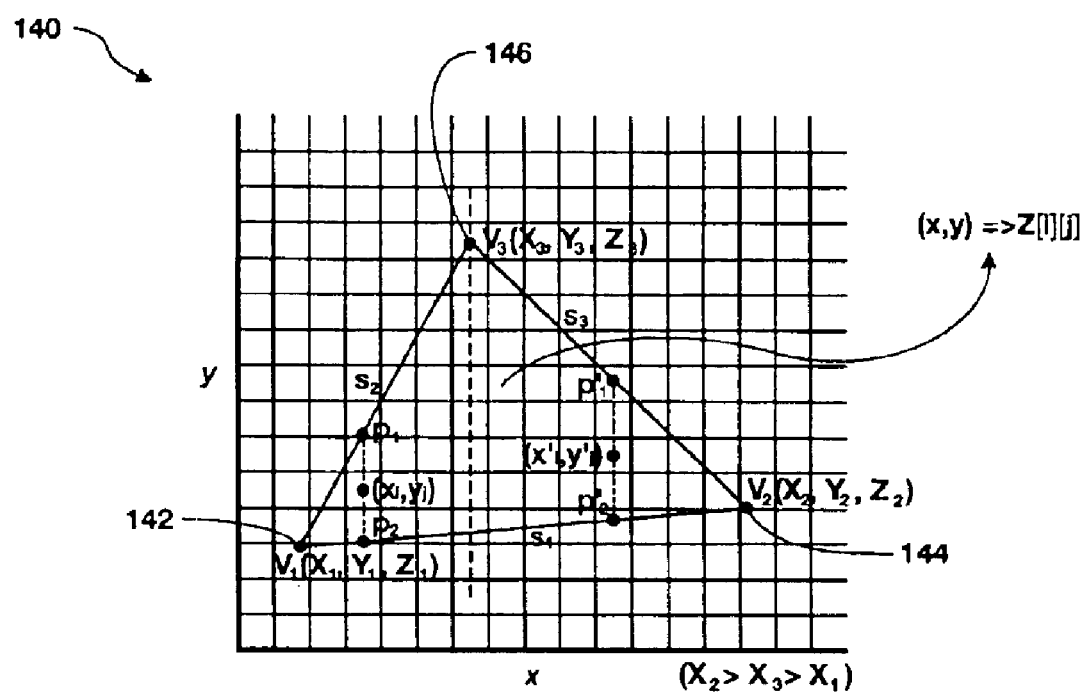
FIG. 8 is an example illustrating the calculation of the Z value of a grid for a triangle.

FIG. 8 demonstrates aspects of the calculation with one triangle as an illustration. The triangle has vertices represented by the points 142,144, and 146. For each triangle $T_i$ with vertices $V_1$, $V_2$, $V_3$ as shown in FIG. 8, the z values of the grids that are covered by $T_i$ are calculated and updated based on the following equations.

$S_1$: $\Delta X_{s1} = X_2 - X_1$;

$AZ_{s1} = (Z_2 - Z_1)/\Delta X_{s1}$; $AY_{s1} = (Y_2 - Y_1)/\Delta X_{s1}$;

$BZ_{s1} = -AZ_{s1} \cdot X_1 + Z_1$; $BY_{s1} = -AY_{s1} \cdot X_1 + Y_1$;

$S_2$: $\Delta X_{s2} = X_3 - X_1$;

$AZ_{s2} = (Z_3 - Z_1)/\Delta X_{s2}$; $AY_{s2} = (Y_3 - Y_1)/\Delta X_{s2}$;

$BZ_{s2} = -AZ_{s2} \cdot X_1 + Z_1$; $BY_{s2} = -AY_{s2} \cdot X_1 + Y_1$;

$S_3$: $\Delta X_{s3} = X_2 - X_3$;

$AZ_{s3} = (Z_2 - Z_3)/\Delta X_{s3}$; $AY_{s3} = (Y_2 - Y_3)/\Delta X_{s3}$;

$BZ_{s3} = -AZ_{s3} \cdot X_3 + Z_3$; $BY_{s3} = -AY_{s3} \cdot X_3 + Y_3$;

For a grid with center coordinate (X, Y), if $X \leq X_3$, $X_{p1} = X, X_{p2} = X$:

$Y_{p1} = AY_{s2} \cdot X_{p1} + BY_{s2}$; $Z_{p1} = AZ_{s2} \cdot X_{p1} + BZ_{s2}$;

$Y_{p2} = AY_{s1} \cdot X_{p2} + BY_{s1}$; $Z_{p2} = AZ_{s1} \cdot X_{p2} + BZ_{s1}$;

$\Delta Y = Y_{p1} - Y_{p2}$; $CZ = (Z_{p1} - Z_{p2})\Delta Y$; $DZ = -CZ \cdot Y_{p2} + Z_{p2}$;

else $(X > X_3)$, $X_{p'1} = X, X_{p'2} = X$:

$Y_{p'1} = AY_{s3} \cdot X_{p'1} + BY_{s3}$; $Z_{p'1} = AZ_{s3} \cdot X_{p'1} + BZ_{s3}$;

$Y_{p'2} = AY_{s1} \cdot X_{p'2} + BY_{s1}$; $Z_{p'2} = AZ_{s1} \cdot X_{p'2} + BZ_{s1}$;

$\Delta Y = Y_{p'1} - Y_{p'2}$; $CZ = (Z_{p'1} - Z_{p'2})\Delta Y$; $DZ = -CZ \cdot Y_{p'2} + Z_{p'2}$;

Finally, the grid has $Z(X, Y) = CZ \cdot Y + DZ$.

We compare the result with the z buffer. If the new value is bigger, it updates the related value in the buffer. Otherwise it is discarded. For the triangle, each column from the leftmost one (related to $X_1$) to the rightmost one (related to $X_2$) is calculated; and for each column, each row from the top one (related to $p_1$ or $p'_1$) to the bottom one (related to $p_2$ or $p'_2$) is calculated based on the above equations.

Figure 9:
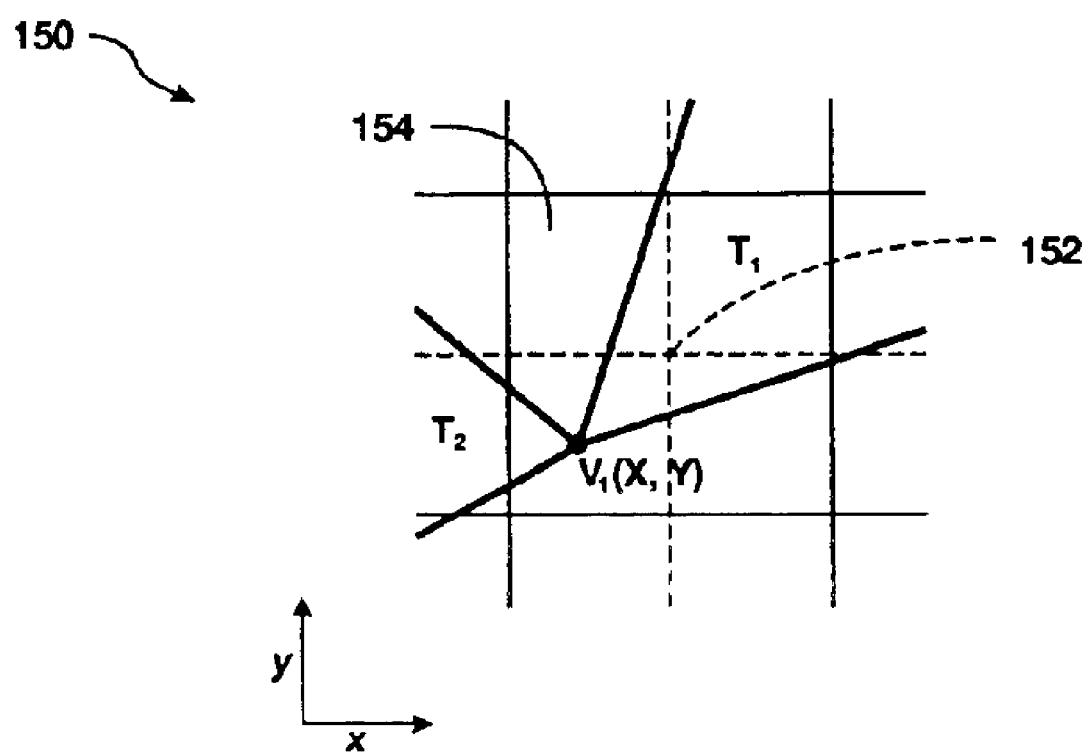
FIG. 9 is an illustration of the mapping from (x, y) to (i, j).

The following equations are used to get the grid position (i, j) for a point (x, y):

$i(X) = (\text{int})[(x/\text{grid\_size}) + 0.5]$ $j(Y) = (\text{int})[(y/\text{grid\_size}) + 0.5]$ Therefore, a grid (i, j) will be related to point (x, y) only if the point is lower, and to the left side of the grid center. This is shown in FIG. 9, represented generally by the numeral 150. The center of a grid 152 is shown. Note that the leftmost vertex of a triangle is actually the rightmost vertex of another triangle (e.g. $V_1$ related to $T_1$ and $T_2$ in FIG. 9). So the following rules are used to avoid the duplication or leaking in the Z value calculations for the grids.

X Direction:
First column=i(X);
Middle column=i(X)−1;
Last column=i(X)−1;
Y Direction:
First row=j(Y);
Last row=j(Y)−1.

The grid size (d) is determined based on the following judgments. Since the resolution of the print head in a preferred embodiment is 300 dpi, each pixel is ⅟300 inch≈3.3 mil. Assume d is N times the pixel size. N=1 is the minimum grid size we should use. If the grid size is equal to this size, the maximum memory size of the Z-buffer is 3000×3000≈9 MB, based on a platform size of 10 inch×10 inch. The actual memory size for a model depends on the X-Y extent of the model. With a bigger N, computational time is reduced and the accuracy of the resulted volume decreases. To examine this factor we assembled eight STL models of increasing complexity and size, ranging from a simple cylinder represented by 112 triangles to a complex model of an automobile requiring over 150,000 triangles. Sweeping body calculations were done on each and the computational time and % error in the sweeping body volume calculations were recorded. Results were obtained from N=1 to N=16 [d=3.3 mils to d=52.8 mils]. The average percentage volume error stayed below 1% for N up to 8 and jumped to over 3% error at N=16. A value of N=4 [13.3 mils] seemed to be a good trade-off, giving average % volume error of about 0.5% and computational times of less than 1 second for even the biggest and most complex model. All tests were performed on a Dell computer with a 1.7 GHz Intel Xeo processor and 2 GB DRAM.

Once a fast and accurate technique is available for estimating support material volumes and weights other important estimates can be done for the user. The estimates from one or more previous builds can be tabulated and recorded by the system computer to maintain a record of the material remaining in the feed cartridges. Or in the preferred embodiment SDM process shown in FIG. 2 the extension of the extrusion bar 60B could be tracked by the system computer to know the volume and weight of support material that remains in that feed cartridge (56B). Other techniques could be used to track the amount of materials remaining in the feed cartridges. Thus it is straightforward to use that information and the support material estimate from this instant invention to communicate to the user through the system computer whether the build she is about to begin has enough support material available to complete the build. It should be noted that the same calculation and communication can be made to the user regarding build material as build material requirement can be calculated from standard CAD or STL data of the object as discussed before. The amount of build material used by the system can be tracked by the extension of the extrusion bar 60A (FIG. 2) in a similar manner and the user can be notified when a build material cartridge 56A should be replaced. As all of these computations can be tabulated and stored over time the system can also provide reports to the user regarding consumption of build and support materials over extended builds.

What have been described above are preferred embodiments in which modifications and changes may be made without departing from the spirit and scope of the accompanying claims. Accordingly, it is intended to embrace all such changes modifications and variation that fall within the spirit and broad scope of the appended claims. All patent applications, patents and other publications cited herein are incorporated by reference in their entirety.

We claim:

1. In a solid freeform fabrication process wherein an object is formed with a removable support material, the process including the steps of a) rapidly and accurately predicting a volume and weight of said support material required to form said object prior to commencing the building of said object, b) predicting when replenishment of said support material is required, and c) tracking consumption of said support material over time.

2. In a solid freeform fabrication process wherein an object is formed with a removable support material, the process for rapidly and accurately predicting a volume and weight of said support material required to form said object prior to commencing the building of said object, the process comprising a) selecting the location and orientation of said object in the build chamber, b) calculating a total sweeping body volume associated with said object, c) calculating the volume of said object, d) subtracting said object volume from said total sweeping body volume to give a sweeping body support material volume, d) multiplying said sweeping body support material volume by a density of support structure to give a support material weight, and e) adding an estimated weight of waste support material.

3. The process of claim 2 wherein the calculation of said sweeping body volume comprises: a) calculating the x-y extent boundaries of said object, c) mapping an x-y grid of dimension d within said boundaries, c) identifying for each element of said grid the associated z-height of the top most element of the object below the grid, d) multiplying the grid areas (d×d) by the each associated z-height to calculate the volumes of the rectangular blocks, and summing the said volumes of rectangular blocks to calculate the total sweeping volume.

4. The process of claim 3 wherein said dimension d is between 3 and 54 mils.

5. The process of claim 4 wherein said dimension d is between 6 and 26 mils.

6. In a solid freeform fabrication process wherein an object is formed from a build material with a removable support material, the process including tho steps of a) rapidly and accurately predicting a volume and weight of said build material required to form said object prior to commencing the building of said object, b) predicting when replenishment of said build material is required, and c) tracking consumption of said build material over time.

7. The process of claim 6 wherein said step of rapidly and accurately predicting said volume and weight of said build material required to form said object prior to commencing the building of the object comprises a) calculating the build material volume of the triangulated STL model of said object from the sum of the signed volume of each tetrahedron formed by a triangle and an original point, b) multiplying said build material volume by a density of build material to give a build material weight, and c) adding an estimated weight of waste build material.

* * * * *